United States Patent [19]

Kuwana et al.

[11] Patent Number: 4,754,855
[45] Date of Patent: Jul. 5, 1988

[54] APPARATUS FOR DRIVING ROTARY VALVE OF SHOCK ABSORBER

[75] Inventors: Kazutaka Kuwana, Toyota; Tsukasa Watanabe, Kariya; Kouji Hirao, Chiryu; Takayuki Tomohara, Toyota; Masanori Hirose, Toyota; Hidemori Tsuka, Toyota, all of Japan

[73] Assignees: Aishin Seiki Kabushiki Kaisha; Toyota Jidosha Kabushiki Kaisha, both of Japan

[21] Appl. No.: 909,390

[22] Filed: Sep. 19, 1986

[30] Foreign Application Priority Data

Sep. 19, 1985 [JP] Japan ................................ 60-207422

[51] Int. Cl.$^4$ ............................................... F16F 9/46
[52] U.S. Cl. ...................................... 188/299; 74/526; 188/319
[58] Field of Search ............... 188/285, 299, 315, 319; 74/526; 251/129.12

[56] References Cited

U.S. PATENT DOCUMENTS

| | | | |
|---|---|---|---|
| 3,559,776 | 2/1971 | Schultze | 188/315 X |
| 4,463,839 | 8/1984 | Ashiba | 188/299 |
| 4,527,676 | 7/1985 | Emura et al. | 188/319 X |
| 4,596,320 | 6/1986 | Shimokura et al. | 188/319 X |
| 4,645,042 | 2/1987 | Inoue et al. | 188/299 X |

Primary Examiner—Kenneth J. Dorner
Assistant Examiner—Peter R. Brown
Attorney, Agent, or Firm—Sughrue, Mion, Zinn, Macpeak and Seas

[57] ABSTRACT

A rotary actuator is disclosed which changes the angular position of the rotary valve which is used to determine the attenuation presented by a shock absorber. The rotary actuator is disposed within a cylindrical piston rod of the shock absorber, and comprises a power transmission mechanism for driving the rotary valve for rotation between a first and a second position within a given range, a d.c. motor for driving the mechanism, a first stop mechanism for selectively stopping the rotation of the motor at a third position which is situated centrally within the given range, and a solenoid assembly for making the first stop mechanism operative. These components are disposed within the cylindrical piston rod in the sequence named from below to above. The power transmission mechanism includes a second stop mechanism which prevents the rotary valve from rotating outside a first and a second location which determine the given range.

14 Claims, 5 Drawing Sheets

APPARATUS FOR DRIVING ROTARY VALVE OF SHOCK ABSORBER

RELATED APPLICATION

The invention relates to an improvement of an invention disclosed in pending U.S. patent application No. 732,209 filed May 9, 1985 by Kouji Hirao et al.

BACKGROUND OF THE INVENTION

The invention relates to an actuator which drives an oil pressure controlling rotary valve used in a piston rod in a shock absorber of a vehicle suspension to a given angle of rotation.

In one form, a shock absorber of a vehicle suspension generally comprises a cylinder containing a quantity of oil and a piston which divides the internal volume of the cylinder into two parts. The cylinder is connected to an axle while the piston is connected to a car body through a hollow piston rod. As mentioned, the piston divides the internal volume of the cylinder into two portions which communicate with each other through a channel. An oil pressure controlling rod extends through the piston rod into the channel. A rotary valve which regulates the flow area of the channel is incorporated into the piston, and the rod is secured to the rotary valve. When the rod is rotated in one direction, the rotary valve rotates in the same direction to increase the flow area of the channel to reduce the resistance presented to a flow of oil from one to the other of the divided portions within the cylinder or a flow in the opposite direction, thus facilitating a movement of the piston. In other words, the vertical oscillation of the piston and hence of the car body is reduced as compared with the vertical oxdillation of the cylinder or the axle, increasing the load applied to a suspension spring while reducing the attenuation exerted by the shock absorber. Conversely, when the controlling rod is rotated in the opposite direction, the flow area of the channel is reduced, providing an added resistance to the movement of the piston. In other words, the vertical oscillation of the piston increases as compared with the vertical oscillation of the cylinder, decreasing the load applied to the suspension spring and causing the shock absorber to exhibit an increased magnitude of attenuation.

An actuator is coupled to the controlling rod in order to establish a given angle of rotation of the controlling rod or the flow area of the channel. Such actuator comprises an electric motor, a reduction gearing which provides a speed reduction to the rotation of the motor before it is transmitted to the controlling rod, and a plurality of switches or a potentiometer which detects an angle of rotation of the controlling rod. A shock absorber control system includes means for providing a command which establishes the attenuation to be exerted by the shock absorber or an angle of rotation of the controlling rod, and a motor control circuit which compares the command against a signal from the switches or the potentiometer to drive the controlling rod to a desired angle of rotation.

In a typical shock absorber of the prior art, the attenuation exerted is established at two levels, high and low, or at three levels of high, medium and low. Where the attenuation is established at two levels, the reduction gearing, for example, is provided with stops which permit the oil pressure controlling rod to rotate within a given angular range from a high to a low end or conversely from a low to a high end while preventing the rod to rotate beyond such angular extent. Representing a time period by T during which the motor is energized to rotate the oil pressure controlling rod through the permitted angular range or through a slightly extended range, the high level of attenuation can be established by energizing the motor for an interval T in the forward direction while the low level of attenuation can be established by energizing the motor for the same interval T in the reverse direction, thus dispensing with the switches or the potentiometer which is required in detecting the angular position. In addition, the hardware of the motor control circuit can be simplified. Where the motor drive is controlled by an electronic equipment such as a microprocessor, the control logic can be simplified. If the motor is energized for the interval T in a direction to exeed either limit position in response to a command which requires a high (or low) level of attenuation when the oil pressure controlling rod is at its high (or low) limit position, the motor will be energized without any rotational movement or will be overloaded since the reduction gearing is constrained by the stop, but any damage to the motor does not occur since the interval T is relatively short in duration. In other words, both the motor and the motor drive are constructed so as to be fully capable of withstanding the energization for the interval T without accompanying any rotation. It is also possible to design a control logic which prevents such energization without accompanying rotation from occurring in a motor control.

In a shock absorber which is designed to establish three levels, namely, high, medium and low, of attenuation, an arrangement is made such that a rotary plate, for example, is secured to the oil pressure controlling rod and is formed with a single aperture which is located so as to correspond to the "medium level" of attenuation. The actuator also includes a solenoid assembly having a plunger which is located opposite to the aperture in the rotary plate whenever the oil pressure controlling rod assumes a position corresponding to the "medium level" of attenuation. When the oil pressure controlling rod is driven to the "medium" position where the solenoid is off and the plunger is urged by an associated spring to move into the aperture formed in the rotary plate from either position corresponding to the "high level" or "low level" of attenuation where the solenoid is off and the plunger is urged by a spring to abut against the surface of the rotary plate, the solenoid assembly is left deenergized while the motor is energized in either forward or reverse direction for substantially an interval of T/2. When the aperture in the rotary plate has rotated to a position directly below the plunger or when the oil pressure controlling rod has rotated to its "medium" position, the plunger is driven into the aperture in the rotary plate under the resilience of the spring. Conversely, when the oil pressure controlling rod is driven from a position corresponding to the "medium" level of attenuation to either position corresponding to the "high" or "low" level of attenuation, the solenoid assembly is energized to withdraw the plunger from the aperture in the rotary plate against the resilience of the spring, and the motor is energized in either reverse or forward direction for an interval substantially equal to T/2. The solenoid assembly is deenergized after the plunger has been withdrawn from the aperture.

Any of such shock absorbers which are designed to establish two or three levels of attenuation may be provided with a position sensor such as an angular position detecting switch assembly or a potentiometer. In such instance, the energization of the motor in forward or reverse direction or deenergization thereof is controlled on the basis of a status signal from the position sensor. The on/off control of the motor alone is insufficient to achieve an accurate positioning of the oil pressure controlling rod due to the inertia of the motor and its associated mechanism, but the combination of the stops which detemine the "high" and the "low" level of attenuation, the rotary disk which determines the "medium" position and its associated solenoid assembly permits an accurate positioning to be achieved. In this manner, the energization of the motor without accompanying its rotation is substantially eliminated.

Referring back to the shock absorber which is designed to establish three levels of attenuation, the free end of the plunger of the solenoid assembly is urged against the rotary plate, which is used to establish a position corresponding to the "medium" level of attenuation, under the resilience of the coiled compression spring, as mentioned previously. The plunger must be advanced into the aperture smoothly when the rotary plate has rotated to place its aperture directly below the plunger. This requires that the aperture has a diameter which is greater than the diameter of the plunger. A difference between the both diameters represents a play, which represents an error in determining the position corresponding to the "medium" level of attenuation. It will be seen that it is desired to provide as small a difference as possible between the both diameters. However, a small difference in the diameters results in a difficulty in causing the plunger to advance into the aperture, and any incomplete advancement of the plunger into the aperture results in a localized deformation or abration of the edge of the aperture and/or the free end of the plunger. Such deformation aggravates the advancement of the plunger into the aperture and also increases the degree of deformation to a greater degree. It is thus seen that the aperture in the rotary plate must be substantially oversized than the plunger, even though this results in an increased magnitude of error in the position which is achieved corresponding to the "medium" level of attenuation. Thus it will be seen that a mechanism for determining the position corresponding to the "medium" level of attenuation which comprises a combination of the rotary plate and the solenoid assembly involves a difficulty that the positioning accuracy and the positioning stability are two conflicting factors.

The apparatus disclosed and claimed in U.S. application Ser. No. 732,209 comprises a reduction gearing including an output shaft which drives a rod such as an oil pressure controlling rod for rotation, an electric motor for driving an input shaft of the reduction gearing for rotation, a rotary plate coupled to the output shaft, and a solenoid assembly for constraining the rotary plate to stop at a given angle of rotation. The rotary plate is provided with a projection which extends from its peripheral surface where the plunger of the solenoid assembly cannot abut it to a point where it may be abutted by the plunger, thus providing a rotational stop. With this arrangement, the free end of the plunger does not abut against the rotational stop. The plunger is retracted upward or advanced downward to its constraining position in accordance with the energization and the deenergization of the solenoid assembly while its position is maintained outside the peripheral surface of the rotary plate. When the rotary stop is driven for rotation when the plunger is located at its constraining position, a side of the projection on the rotary stop bears against the side of the plunger, whereby the rotary stop is prevented from rotating by the plunger. When the rotary stop is to be allowed to rotate, the solenoid assembly is energized to retract the plunger from its constraining position. When the plunger is retracted, no part of the rotary stop bears against the plunger.

This arrangement is mounted on the top end of a shock absorber. The motor and the solenoid assembly are disposed side by side, and accordingly the arrangement occupies a relatively extensive space laterally on the top end of the shock absorber. This imposes a certain restriction upon the coupling of the piston rod to the upper stay of the car body. In addition, the motor and the solenoid assembly are susceptible to external forces. The mechanism of the arrangement may be deformed or destructed if the external force applied is excessively high.

SUMMARY OF THE INVENTION

It is a first object of the invention to provide a rotary valve drive apparatus which is adapted to be contained within a shock absorber. It is a second object of the invention to provide a rotary valve drive apparatus which is relatively easily assembled into the cylindrical piston rod of a shock absorber.

The above objects are accomplished in accordance with the invention by a rotary valve drive apparatus comprising a power transmission mechanism disposed within the cylindrical piston rod of a shock absorber and having an output shaft which is coupled to the upper end of a rotary valve; an electric motor disposed within the cylindrical piston rod of a shock absorber above the power transmission mechanism and including a rotary shaft having its lower end coupled to an input shaft of the power transmission mechanism and its upper end projecting upward; a solenoid assembly disposed within the cylindrical piston rod of a shock absorber at a location above the upper end of the rotary shaft of the electric motor and including a vertically extending rod, a spring member for urging the rod vertically up or down and an electrical coil which is effective, when energized, to force the rod down or up against the resilience of the spring member; and first stop means disposed within the cylindrical piston rod of a shock absorber and including an abutment member secured to the upper end of the rotary shaft of the electric motor and extending laterally therefrom, and a first stop secured to the lower end of the rod of the solenoid assembly for preventing a rotation of the abutment member when the rod of the solenoid assembly is driven to its lower position and for permitting a rotation of the abutment member when the rod of the solenoid assembly is driven to its upper position. When the electrical coil is energized (or deenergized) and the rod of the solenoid assembly assumes its upper position, the electric motor may be energized in order to change the pressure of the shock absorber, thereby causing the rotary shaft to rotate the rotary valve. When the electrical coil is deenergized (or energized), the rod of the solenoid assembly assumes its lower position, so that when the motor is energized, the abutment member mounted on the upper end of the rotary shaft bears against the first stop, whereby the rotation of the rotary shaft is interrupted at a given angle, thus bringing the rotary valve to a stop at a given angle of rotation.

In a preferred embodiment of the invention, the power transmission mechanism is also provided with second stop means which define a first and a second position representing the opposite ends of a permissible range of rotation of the rotary valve, so that the rotary valve may be selectively positioned at one of three positions. The first stop means then is effective to position the rotary shaft of the motor such that the rotary valve assumes a third position which is intermediate the first and the second position.

Other objects and features of the invention will become apparent from the following description of a preferred embodiment thereof with reference to the drawings.

DESCRIPTION OF PREFERRED EMBODIMENT

Figure 1:
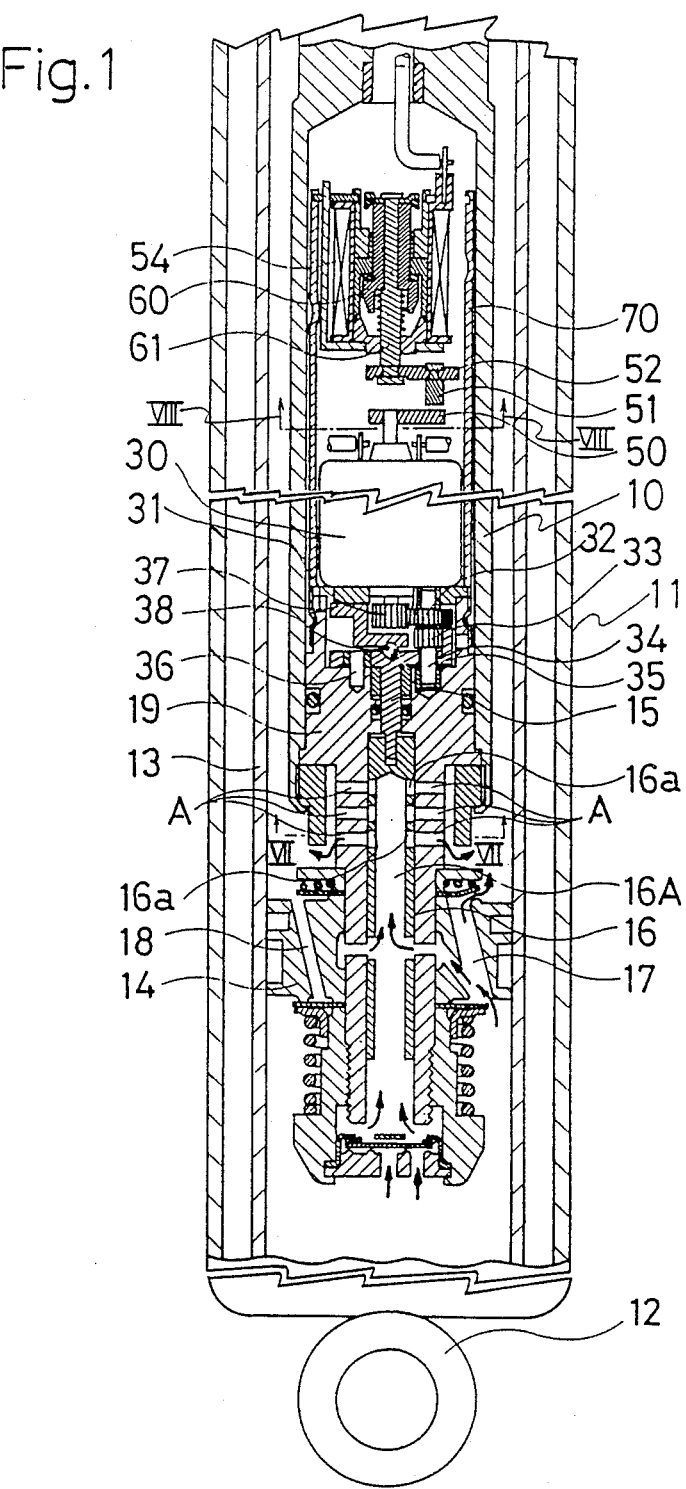
FIG. 1 is a longitudinal section of a shock absorber incorporating the apparatus according to the invention, generally illustrating the apparatus of the invention as assembled into a cylindrical piston rod.

Referring to FIG. 1 which illustrates an oil pressure controlling piston of a shock absorber, the shock absorber includes an outer shell 11, the bottom of which is provided with a lower nuckle joint 12 which is used to fasten the shock absorber to the axle of a vehicle through a lower stay. While not shown, an upper nuckle joint is disposed on the top (not shown) of a piston rod 10 for fastening the rod 10 to the frame of the vehicle through an upper stay. A spring, not shown, is interposed between the frame and the axle, with the spring and the shock absorber constituting together the suspension of the vehicle.

Disposed inside the outer shell 11 is an inner cylinder 13, the lower end of which has a base valve assembly, not shown, mounted thereon. The piston rod 10 is disposed inside the inner cylinder 13 and has a valve rod 19 mounted on its bottom end. A piston 14 including a valve assembly of known form is mounted on the valve rod 19, with a rotary valve 16 being fitted into the valve rod 19 so as to be rotatable about the center axis thereof.

Figure 7A:
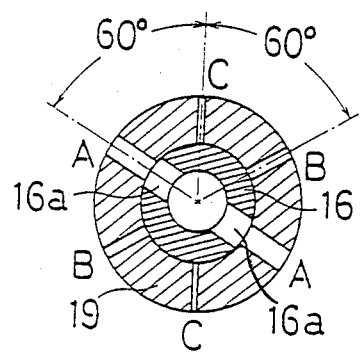
FIGS. 7a, 7b and 7c are cross sections taken along the line VII—VII shown in FIG. 1, illustrating the rotary valve as it is at its first, second and third position, respectively.

The piston 14 is formed with a passage 17 of a relatively large diameter which passes an oil from the space below to the space above the piston 14 as the vehicle bounds, and also with another passage 18 having a relatively small diameter which passes an oil from the space above to the space below the piston as the vehicle rebounds. The valve rod 19 having the rotary valve 16 fitted therein is formed with three vertically spaced groups of orifices, including orifices A of a larger diameter, orifices B of a medium diameter and orifices C of a reduced diameter, for providing a communication between the space above the piston 14 and the internal space inside the rod 19. As shown in FIG. 7a, the orifices A, B and C extend diametrically of the rod 19, passing through the center thereof. The rotary valve 16 is formed with orifices 16a, located at three elevations corresponding to those of the groups of orifices A, B and C and each with a diameter which is slightly greater than that of the orifice A so as to provide a communication between the space above the piston 14 and the internal space within the rod 19 through a selected one of the orifices A, B and C. The purpose of providing the orifices A, B and C as well as the corresponding orifices 16a at three elevations is to assure a channel area which is required to provide a bypass passage for each orifice. The internal space within the rotary valve 16 communicates with the space below the piston 14 through the passage 17 of a larger diameter mentioned above. Thus, it will be seen that the orifices A, B and C and the orifices 16a serve providing a communication between the space above and the space below the piston 14, determining the channel area for such communication in accordance with a particular orifice 16a which is aligned one of the orifices A, B and C or in accordance with the angle of rotation of the rotary valve 16.

Figure 7B:
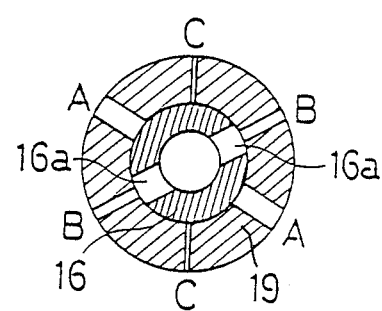

When the rotary valve 16 assumes a first position (see FIG. 7a), the communication between the space above and below the piston 14 is provided with an increased channel area (A), facilitating a movement of the piston 14 up and down. When the rotary valve 16 assumes a third position (see FIG. 7c), the channel area for the communication of the oil (C) is reduced, presenting resistance to the movement of the piston up and down. When the rotary valve 16 assumes its second position (see FIG. 7b), the piston 14 moves with a degree of ease which is intermediate those obtained at the first and the third position, respectively. It is to be noted here that the ease with which the piston 14 moves up and down is determined by a particular one of the orifices A, B and C, with which the orifice 16a in the rotary valve 16 is aligned.

Figure 7C:
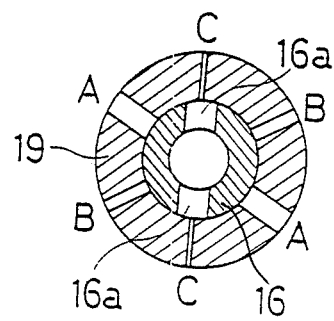

A power transmission mechanism (35, 36, 33, 32, 31), an electric motor 30, first stop means (50, 51, 52, 65a, 65b) and a solenoid assembly (61, 63, 54) which constitute together the apparatus of the invention are received in the internal space within the piston rod 10 above the rotary valve 16 in the sequence named from below. The apparatus of the invention locates the rotary valve 16 to either the first position (FIG. 7a), the second position (FIG. 7b) or the third position (FIG. 7c).

Figure 2:
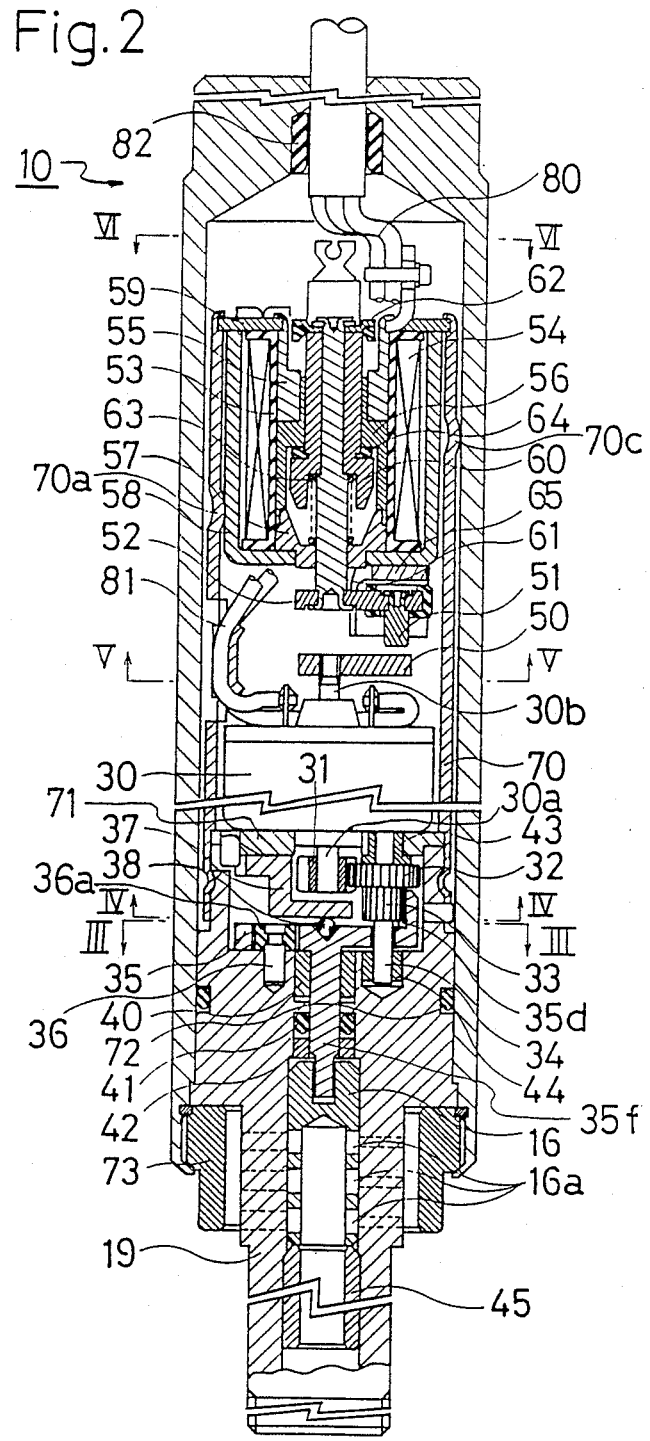
FIG. 2 is an enlarged cross section showing the detail of the internal construction of the piston rod shown in FIG. 1, together with the detail of the apparatus according to the invention which is assembled into the piston rod.
Figure 3:
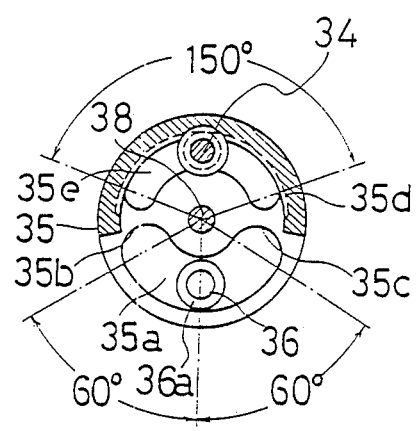
FIG. 3 is a cross section taken along the line III—III shown in FIG. 2.

Referring to FIG. 2 which shows the internal construction of the piston rod 10 in detail together with FIG. 3, a center shaft 35f for a gear 35, which represents the output shaft of the power transmission mechanism, has its lower end coupled to the upper end of the rotary valve 16. As shown in FIG. 3, the gear 35 has a semi-annular tooth 35d and also has arcuate openings 35a, 35e. A second stop pin 36 which is fixedly mounted on the rod 19 projects through the opening 35a, while a gear shaft 34 which is rotatably mounted on the rod 19 by means of a bearing 44 extends through the opening 35e. An antiimpact resilient ring 36a is fitted on the second stop pin 36. The rotary valve 16 is driven for rotation by the gear 35 and assumes the first position (FIG. 7a) when one end 35c of the opening 35a formed in the gear 35 bears against the resilient ring 36a on the second stop pin 36, and assumes the second position (FIG. 7b) when the other end 35b (FIG. 3) of the opening 35a in the gear 35 bears against the resilient ring 36a on the second stop pin 36. It is to be noted that the first and the second position of the rotary valve 16 are determined by the opposite ends 35c and 35b, respectively, of the opening 35a formed in the gear 35 of the power transmission mechanism.

Figure 4:
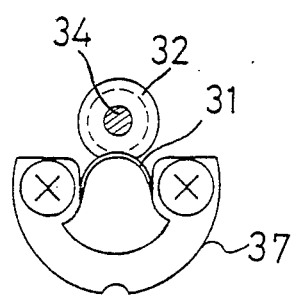
FIG. 4 is a cross section taken along the line IV—IV shown in FIG. 2.

Mounted on the gear shaft 34 extending through the opening 35e (FIG. 3) in the gear 35 are a small diameter gear 33 (FIG. 2) which meshes with the semi-annular tooth 35d of the gear 35 and a large diameter gear 32. The large diameter gear 32 is in meshing engagement with a gear 31 which is fixedly mounted on the lower end 30a of the rotary shaft of the motor 30. The power transmission mechanism comprising the gears 31, 32, 33 and 35d has a reduction ratio of 1/6. However, the direction of rotation of the rotary valve 16 is opposite from that of the motor 30. On its upper surface, the gear 35 is centrally formed with a funnel-shaped pit in which a small ball 38 is placed. A bracket 37 rests on the ball 38. The bracket 37 is fixedly mounted on a bracket 71 on which the motor 30 is fixedly mounted. The lower surface of the bracket 37 is shown in FIG. 4. The upper end of the gear shaft 34 is rotatably carried by the bracket 71 by means of a bearing 43.

Figure 5:
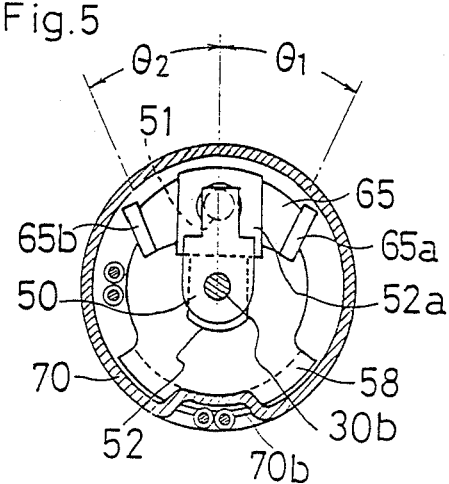
FIG. 5 is a cross section taken along the line V—V shown in FIG. 2.

Referring to FIG. 2 which shows the interior of the piston rod 10 in detail together with FIG. 5, an abutment member 50 of first stop means is secured to the upper end 30b of the rotary shaft of the motor 30. Since the abutment member 50 rotates in the same direction as the rotary shaft, it is to be noted that the direction in which the abutment member 50 rotates is opposite from the direction of rotation of the rotary valve 16. FIGS. 2 and 5 illustrate the position of the abutment member 50 when the rotary valve 16 assumes its third position (see FIG. 7c). A plunger rod 61 of a solenoid assembly is located above the upper end 30b, and a first stop arm 52 is secured to the lower end of the rod 61. A first stop pin 51, which is located above the free end of the abutment member 50, is secured to the arm 52 so as to extend downward.

The plunger rod 61 of the solenoid assembly is formed of a non-magnetic material, and has a plunger 60 of a magnetic meterial secured thereto. The rod 61 extends through a first end core 57 of a magnetic material while the plunger 60 extends through a stop bushing 56 of a non-magnetic material which is fixedly connected to a second end core 55 of a magnetic material. The bushing 56 and the second end core 55 extend through a bobbin 53 on which an electrical coil 54 is disposed. The upper end of the second end core 55 is secured to an end plate 59 of a magnetic material. A yoke 58 of a magnetic material which surrounds the electrical coil has the first end core 57 secured to its lower end and has the end plate 59 secured to its upper end. A coiled compression spring 63 is interposed between the first end core 57 and the plunger 60 and its resilience is effective to push the plunger 60 upward, whereby the first stop pin 51 is retracted upward above the abutment member 50, as shown in FIG. 2. However, when the electrical coil 54 is energized, the plunger 60 is attracted toward the first end core 57, whereupon the rod 61, the arm 52 and the first stop pin 51 move downward to allow the first stop pin 51, the arm 52 and the rod 61 to be rotated as a result of the abutment of the abutment member 50 against the first stop pin 51 when the abutment member 50 rotates from the first position (FIG. 7a) toward the second position (FIG. 7b) or vice versa.

Figure 8A:
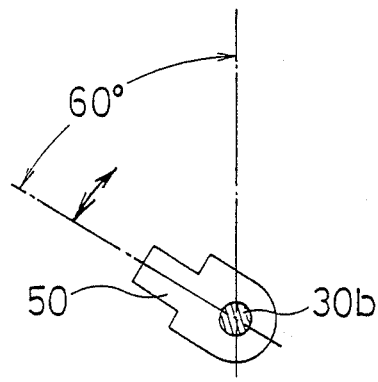
FIGS. 8a, 8b, 8c and 8d are cross sections taken along the line VIII—VIII shown in FIG. 1, specifically FIGS. 8a and 8c illustrating the abutment member as it is moving toward a position corresponding to a first position (FIG. 7a) of the rotary valve from a position corresponding to a second position (FIG. 7b) of the rotary valve and toward a position corresponding to the second position (FIG. 7b) of the rotary valve from the position corresponding to the first position (FIG. 7a) of the rotary valve, and FIGS. 8b and 8d illustrating the abutment member as it is driven to a third position (FIG. 7c) of the rotary valve.
Figure 8B:
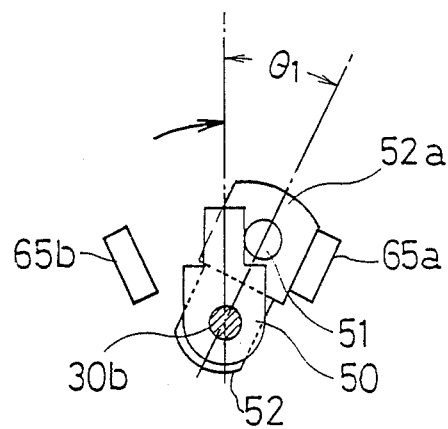
Figure 8C:
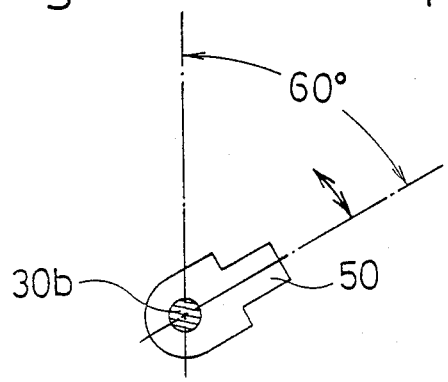
Figure 8D:
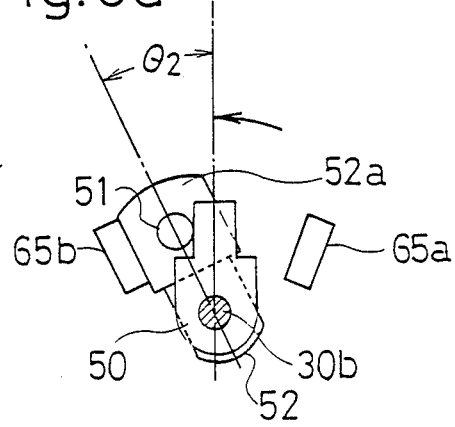

Continuing reference to FIG. 2, an arm stop 65 is secured to the yoke 58 of the solenoid assembly, and carries raised pieces 65a, 65b at its opposite ends, which project downwardly so as to be located on the opposite sides of the arm 52. Accordingly, as the arm 52 rotates, it abuts against either raised piece 65a or 65b. To reduce the impact and to prevent the occurrence of percussion sounds, the free end of the arm 52 is coated with an elastic material 52a. The raised pieces 65a, 65b, the width of the arm 52 as coated with the elastic material 52a, the diameter of the first stop pin 51 and the width of the abutment member 50 are chosen such that the elastic material 52a on the arm 52 abuts against the raised piece 65b to block the rotation of the abutment member 50 and the motor 30 at the position shown in FIG. 8d or at the third position (FIG. 7c) if the first stop pin 61 assumes its lower position or if the coil 54 is energized when the rotary valve 16 rotates from its first position (FIG. 7a) to its second position (FIG. 7b ), and such that the elastic material 52a on the arm 52 abuts against the raised piece 65a to block the rotation of the abutment member 50 and the motor 30 at the position shown in FIG. 8b or at the third position if the first stop pin 51 assumes its lower position when the rotary valve 16 rotates from its second to its first position. When the rotary valve 16 is at its third position (FIG. 7c), the end 35c which determines the first position and the end 35b which determines the second position of the opening 35a in the gear 35 are located symmetrically with respect to the second stop pin 36 (see FIG. 3), and the abutment member 50 then assumes its position shown in FIGS. 5, 8b and 8d.

Figure 6:
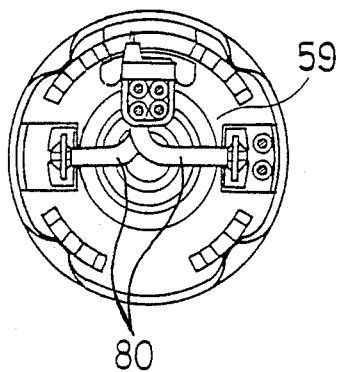
FIG. 6 is a cross section taken along the line VI—VI shown in FIG. 2.

Referring to FIGS. 2, 5 and 6, the yoke 58 of the solenoid assembly has its end mounted on an elongated cylindrical housing 70 by an end plate 59 together with the second end core 55 in a manner such that a relative vertical movement and a relative rotation between the housing 70 and the yoke 58 are prevented by the provision of projections 70a, 70b on the inside of the housing 70. The motor 30 is disposed within the housing 70 and is mounted therein by means of the motor bracket 71 which is secured to the motor 30. The lower end of the housing 70 is fixedly connected to the upper end of the valve rod 19.

Both the housing 70 and the valve rod 19 are in turn inserted into the piston rod 10 of the shock absorber, with an O-ring 72 providing a seal between the valve rod 19 and the piston rod 10. The piston rod 10 is clamped by a nut 73 to urge the valve rod 19 upward, and the bottom end of the piston rod 10 is crimped to the nut 73, whereby it is secured to the latter. After the housing 70 is inserted into the piston rod 10, an external projection 70c on the housing 70 resiliently bears against the internal surface of the piston rod 10, thus providing a coupling between the housing 70 and the piston rod 10 of the shock absorber.

Lead wires 80 connected to the electrical coil 54 of the solenoid assembly and lead wires 81 connected to the d.c. motor 30 are taken out of the top end of the piston rod 10. It will be understood that the both lead wires 80, 81 are sealed by a lead wire bushing 82.

The operation of the shock absorber constructed in the manner mentioned above will now be described. The abutment member 50 assumes the same position when the rotary valve 16 is at the first, second and third positions. Since the angular difference between the first and third position and that between the second and third position of the rotary valve is 60° as shown in FIG. 7a and the reduction rate of the transmission mechanism (35, 36, 33, 32, 31) is 1/6, the abutment member 50 rotates by one rotation (360°) as the rotary valve 16 rotates from the first or second position (FIG. 7a or FIG. 7b) to the third position (FIG. 7c).

When the rotary valve 16 assumes its first position (FIG. 7a) the energization of the motor 30 for rotation in the forward direction by two rotation causes the rotary valve 16 to assume its second position (FIG. 7b) if the electrical coil 54 is not energized, whereas the energization of the motor 30 for rotation in the forward direction by one rotation causes the rotary valve 16 to assume its third position (FIGS. 7c and 8d) if the electrical coil 54 is energized before the rotation of the motor 30 reaches $(360° - 60)°$ (FIG. 8c) from the initiation of the rotation. Namely when the electrical coil 54 is energized before the angle $(360° - 60)°$ of rotation, the first stop pin 51 assumes a down position within the rotation by 8 (FIG. 8c) of the motor 30. Then the abutment member 50 strikes upon the first stop pin 51 and drives the first stop pin 51 to the position shown in FIG. 8d. When the rotary valve 16 assumes its second position (FIG. 7b) the energization of the motor 30 for rotation in the reverse direction by two rotations causes the rotary valve 16 to assume its first position (FIG. 7a) if the electrical coil 54 is not energized, whereas the energization of the motor 30 for rotation in the reverse direction by one rotation causes the rotary valve 16 to assume its third position (FIGS. 7c and 8b) if the electrical coil 54 is energized before the rotation of the motor 30 reaches $(360° - 60)°$ (FIG. 8a) from the initiation of the rotation. Namely when the electrical coil 54 is energized before the angle $(360° - 60)°$ of rotation, the first stop pin assumes a down position within the rotation by 8 (FIG. 8a) of the motor 30. The the abutment member 50 strikes upon the first stop pin 51 and drives the first stop pin 51 to the position shown in FIG. 8b. The rotary valve 16 may be driven from its third to its first position by energizing the motor 30 for rotation in the reverse direction by one rotation without energizing the electrical coil 54, and may be driven from its third to its second position by energizing the motor 30 for rotation in the forward direction by one rotation without energizing the electrical coil 54.

When the rotary valve 16 is in its first position, the orifice 16a therein communicates with the orifice A in the valve rod 19. Accordingly, when the wheels bound, an oil bypass passage is formed including the large diameter passage 17 in the piston 14, the central area 16A (see FIG. 1) of the rotary valve 16, the orifice 16a, and the orifice A in the valve rod 19. When the wheels rebound, an oil passage is formed including the small diameter passage 18, the orifice A and the central area 16A of the rotary valve 16. Since the orifice A has an increased diameter to present a reduced resistance to an oil flow, an oil flow from the space below to the space above the piston 14 or in the opposite direction occurs freely, thus facilitating a vertical movement of the piston 14. In other words, the attenuation presented by the shock absorber is at its "low" level.

When the rotary valve 16 is in its second position, the orifice 16a in the rotary valve 16 communicates with the orifice B in the valve rod 19. Accordingly, when the wheels bound, an oil bypass passage is formed including the large diameter passage 17 in the piston 14, the central area 16A and the orifice 16a in the rotary valve 16, and the orifice B in the valve rod 19. When the wheels rebound, an oil passage is formed including the small diameter passage 18, the orifice B and the central area 16A in the rotary valve 16. Since the orifice B has a medium diameter, the attenuation presented by the shock absorber is at its "medium" level.

When the rotary valve 16 is in its third position, the orifice 16a in the rotary valve 16 communicates with the orifice C in the valve rod 19. Accordingly, when the wheels bound, an oil bypass passage is formed including the large diameter passage 17 in the piston 14, the central area 16A and the orifice 16a in the rotary valve, and the orifice C in the valve rod 19. When the wheels rebound, an oil passage is formed including the small diameter passage 18, the orifice C and the central area 16A in the rotary valve. The orifice C has a small diameter to present an increased resistance to an oil flow in a direction from the space below to the space above the piston 14 or in the opposite direction, thus resisting a vertical movement of the piston 14. In other words, the attenuation presented by the shock absorber is at its "high" level.

Having described a preferred embodiment of the invention, a number of changes, modifications and substitutions will readily occur to one skilled in the art without departing from the scope of the invention as defined in the appended claims.

What is claimed is:

1. Apparatus for driving rotary valve of a shock absorber comprising
   a power transmission mechanism disposed within a cylindrical piston rod of a shock absorber and having an input shaft an output shaft which is coupled to the upper end of rotary valve of the shock absorber a reduction gearing means between said input and output shafts;
   an electric motor disposed within the cylindrical piston rod of the shock absorber at a location above the power transmission mechanism and having a rotary shaft having its lower end coupled to the input shaft of the power transmission mechanism and its upper end extending upward;
   a solenoid assembly disposed within the cylindrical piston rod of the shock absorber at a location above the upper end of the rotary shaft of the motor, and including a vertically extending rod, a spring member for urging the rod vertically in one of the upward and downward directions and an electrical coil for driving the rod in the other direction against the resilience of the spring member;
   and first stop means disposed within the cylindrical piston rod of the shock absorber and including an abutment member secured to the upper end of the rotary shaft of the motor and laterally extending therefrom and a first stop secured to the lower end of the rod of the solenoid assembly for blocking the rotation of the abutment member at a given location when the rod assumes its lower position and for permitting the rotation of the abutment member when the rod assumes its upper position.

2. An apparatus for driving rotary valve of a shock absorber according to claim 1 in which the rod of the solenoid assembly is rotatable about its longitudinal axis, and in which the first stop includes a first stop arm having its one end secured to the lower end of the rod and laterally extending therefrom and a first stop pin secured to the other end of the first stop arm and extending downward for abutment against the abutment member when the rod assumes its lower position, the first stop means further including arm stops for blocking clockwise and counter-clockwise rotation of the first stop arm at a first and a second location, respectively.

3. An apparatus for driving rotary valve of a shock absorber according to claim 2 in which the position assumed by the abutment member when the rod assumes its lower position and the abutment member abuts against the first stop pin and the first stop arm is then located by the arm stop at the second location substantially coincides with the position assumed by the abutment member when the rod assumes its lower position and the abutment member abuts against the first stop pin and the first stop arm is then located by the arm stop at the first location.

4. An apparatus for driving rotary valve of a shock absorber according to claim 1 in which the power transmission mechanism also includes second stop means which blocks the rotation of the rotary shaft of the motor at an angular position which is different from the angular position where the rotation of the rotary shaft of the motor is blocked by the first stop means.

5. An apparatus for driving rotary valve of a shock absorber according to claim 4 in which the power transmission mechanism comprises a gear fixedly mounted on the lower end of the rotary shaft of the motor, a vertically extending input rotary shaft disposed laterally alongside the rotary shaft of the motor, a second gear integrally mounted on the input rotary shaft for meshing engagement with the gear on the motor shaft, an intermediate gear disposed for rotation with the rotation of the input rotary shaft and an output gear having an internal tooth disposed in meshing engagement with the intermediate gear and carried by an output rotary shaft which is coupled to the rotary valve, and in which the second stop means includes ends of an opening formed in the output gear and extending in the direction of rotation thereof, and a second stop pin projecting through the opening.

6. An apparatus for driving rotary valve of a shock absorber comprising a valve rod inserted into the lower portion of a cylindrical piston rod of a shock absorber and secured to the lower end of the piston rod and having a vertically extending central axis bore, the bottom portion of which receives a rotary valve of a shock absorber;

a cylindrical housing disposed within the cylindrical piston rod and having its lower end secured to the upper end of the valve rod;

a power transmission mechanism disposed within the cylindrical housing and having an input shaft, an output shaft which is coupled to the upper end of the rotary valve and gear reduction means between said input and output shafts;

an electric motor disposed within the cylindrical housing at a location above the power transmission mechanism and secured to the cylindrical housing and including rotary shaft having its lower end coupled to the input shaft of the power transmission mechanism and its upper end extending upward;

a solenoid assembly disposed within the cylindrical housing at a location above the upper end of the rotary shaft of the motor and secured to the cylindrical housing, and including a vertically extending rod, a spring member for urging the rod in one of the upward end downward directions and an electrical coil for driving the rod in the other direction against the resilience of the spring member;

and first stop means disposed within the cylindrical housing and including an abutment member secured to the upper end of the rotary shaft of the motor and laterally extending therefrom, and a first stop secured to the lower end of the rod for blocking the rotation of the abutment member at a given position when the rod assumes its lower position and for permitting the rotation of the abutment member when the rod assumes its upper position.

7. An apparatus for driving rotary valve of a shock absorber according to claim 6 in which the rod of the solenoid assembly is rotatable about its longitudinal axis and in which the first stop comprises a first stop arm having its one end secured to the lower end of the rod and laterally extending therefrom and a first stop pin secured to the other end of the first stop arm and extending downward for abutment against the abutment member when the rod assumes its lower position; the first stop means additionally including arm stops for blocking clockwise and counter-clockwise rotations of the first stop arm at a first and a second location.

8. An apparatus for driving rotary valve of a shock absorber according to claim 7 in which the position assumed by the abutment member when the rod assumes its lower position and the abutment member abuts against the first stop pin and the first stop arm is then located by the arm stop at the second location substantially coincides with the position assumed by the abutment member when the rod assumes its lower position and the abutment member abuts against the first stop pin and the first stop arm is then located by the other arm stop at the first location.

9. An apparatus for driving rotary valve of a shock absorber according to claim 6 in which the power transmission mechanism also includes second stop means which blocks the rotation of the rotary shaft at an angular position which is different from the angular position where the rotation of the rotary shaft of the motor is blocked by the first stop means.

10. An apparatus for driving rotary valve of a shock absorber according to claim 9 in which the power transmission mechanism comprises a gear fixedly mounted on the lower end of the rotary shaft of the motor, a vertically extending input rotary shaft disposed alongside the rotary shaft of the motor, a second gear integrally mounted on the input rotary shaft for meshing engagement with the gear on the motor shaft, an intermediate gear disposed for rotation with the input rotary shaft, and an output gear having an internal tooth which is in meshing engagement with the intermediate gear and carried by an output rotary shaft which is coupled to the rotary valve, and in which the second stop means comprises ends of an opening formed in the output gear and extending in the direction of rotation thereof, and a second stop pin secured to the valve rod and projecting through the opening.

11. An apparatus for driving rotary valve of a shock absorber comprising
   a valve rod inserted into the bottom portion of a cylindrical piston rod of a shock absorber and secured to the lower end of the piston rod and having a vertically extending central axial bore, the bottom portion of which receives a rotary valve of a shock absorber;
   a cylindrical housing disposed within the cylindrical piston rod and having its lower end secured to the upper end of the valve rod;
   a power transmission mechanism disposed within the cylindrical housing and including an input shaft, an output shaft coupled to the upper end of the rotary valve, gear reduction means between said input and out shafts and limit means which limit the rotation of the outpout shaft to a given range;
   an electric motor disposed within the cylindrical housing at a location above the power transmission mechanism and including a rotary shaft having its lower end coupled to the input shaft of the power transmission mechanism and its upper end projecting upward;
   a rod disposed within the cylindrical housing at a location above the upper end of the rotary shaft of the motor and secured to the cylindrical housing and rotatable about a vertically extending axis;
   a solenoid assembly including a spring member for urging the rod in one of the upward and downward directions and an electrical coil for driving the rod in the other direction against the resilience of the spring member;
   and first stop means disposed within the cylindrical housing and including an abutment member secured to the upper end of the rotary shaft of the electric motor and laterally extending therefrom, a first stop arm having its one end secured to the lower rod of the rod of the solenoid assembly and laterally extending therefrom, a first stop pin secured to the other end of the first stop arm and extending downward for abutment against the abutment member when the rod assumes its lower position, and arm stops for blocking clockwise and counter-clockwise rotation of the first stop arm at first and second locations.

12. An apparatus for driving rotary valve of a shock absorber according to claim 11 in which the position assumed by the abutment member when the rod assumes its lower position and the abutment member abuts against the first stop pin and the first stop arm is then located by one of the arm stops at the second location substantially coincides with the position assumed by the abutment member when the rod assumes its lower position and the abutment member abuts against the first stop pin and the first stop arm is then located by the other arm stop at the first location.

13. An apparatus for driving rotary valve of a shock absorber according to claim 12 in which the position assumed by the abutment member when the first stop arm is located by the associated arm stop at the first location represents a center position within a range of rotation of the abutment member which corresponds to the range determined by the second stop means.

14. An apparatus for driving rotary valve of a shock absorber according to claim 11 in which the power transmission mechanism comprises a gear fixedly mounted on the lower end of the rotary shaft of the motor, a vertically extending input rotary shaft disposed alongside the rotary shaft of the motor, a second gear integrally mounted on the input rotary shaft for meshing engagement with the gear on the motor shaft, an intermediate gear disposed for rotation with the input rotary shaft, and an output gear having an internal tooth which is disposed for meshing engagement with the intermediate gear and carried by an output rotary shaft which is coupled to the rotary valve, and in which the second stop means comprises ends of an opening formed in the output gear and extending in the direction of rotation thereof, and a second stop pin secured to the valve rod and projecting through the opening.

* * * * *